United States Patent [19]

Fagerburg et al.

[11] Patent Number: 4,897,454
[45] Date of Patent: Jan. 30, 1990

[54] BLENDS OF POLY(ARYLENE SULFIDE) AND COPOLY(ARYLENE SULFIDE) MODIFIED WITH DIPHENYL ETHER

[75] Inventors: David R. Fagerburg; Joseph J. Watkins; Paul B. Lawrence, all of Kingsport, Tenn.

[73] Assignee: Eastman Kodak Company, Rochester, N.Y.

[21] Appl. No.: 324,119

[22] Filed: Mar. 17, 1989

[51] Int. Cl.$^4$ .................. C08L 81/04; C08G 75/14
[52] U.S. Cl. ................................ 525/537; 525/535
[58] Field of Search .......................... 525/537

[56] References Cited

U.S. PATENT DOCUMENTS 2,513,188 9/1948 Macallum ........................... 260/79
2,538,941 1/1948 Macallum ........................... 260/79
4,786,713 11/1988 Rule .................................. 528/86
4,820,759 4/1989 Ichikawa et al. .................. 525/537

FOREIGN PATENT DOCUMENTS 237006 9/1987 European Pat. Off. .

Primary Examiner—John C. Bleutge
Assistant Examiner—David W. Woodward
Attorney, Agent, or Firm—Charles R. Martin; William P. Heath, Jr.

[57] ABSTRACT

A composition comprising an admixture of (A) from 99.9 to 90 weight percent, based on the weight of the admixture, of a polymer having repeating units corresponding to the structure

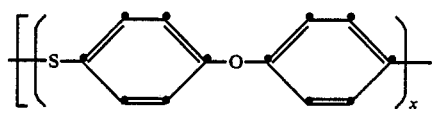

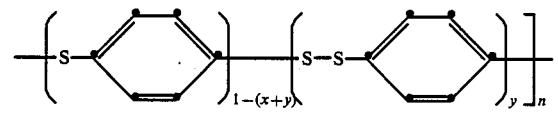

wherein y is in the range of 0.001 to 0.15, x is in the range of 0.01 to 0.50 and n is at least 100, and (B) from 0.1 to 10 weight percent, based on the weight of the admixture, of a poly(phenylene sulfide) corresponding to the structure

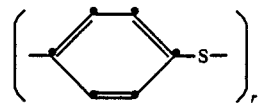

where r is at least 25.

3 Claims, No Drawings

BLENDS OF POLY(ARYLENE SULFIDE) AND COPOLY(ARYLENE SULFIDE) MODIFIED WITH DIPHENYL ETHER

The invention relates to blends of a poly(arylene sulfide) and a copoly(arylene sulfide) which has been modified with diphenyl ether.

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) is prepared commercially by reacting p-dichloro-benzene with sodium sulfide in a polar organic solvent to produce poly(phenylene sulfide) and the by-product sodium chloride. this process is known as the Edmonds-Hill polymerization procedure and the basic process is disclosed in U.S. Pat. No. 2,513,188 and U.S. Pat. No. 2,538,941. An improvement on this procedure involves adding N-haloamides as catalysts.

Recently copoly(arylene sulfides) have been discovered. These polymers are disclosed in Ser. No. 117,722 filed 11/6/87, now U.S. Pat. No. 4,786,713, and can be described as having repeating units corresponding to the structure

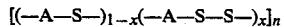

wherein x is in the range of 0.5 to 0.001, A is aromatic and n is at least 200 and is preferably in the range of 500 to 5,000 as determined by melt viscosity measurement at 300° C.

It has also been discovered that these copoly(arylene sulfides) can be admixed with small amounts of poly(arylene sulfide) polymer to prepare a composition which exhibits enhanced rates of crystallization. These compositions are disclosed in Ser. No. 224,509 filed 7/25/88, now U.S. Pat. No. 4,877,851.

It has also been discovered that the poly(arylene sulfide) polymer can be modified with diphenyl ether units to prepare a polymer corresponding to the structure

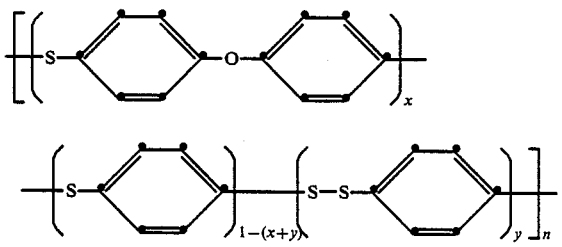

wherein y is in the range of 0.005 to 0.10, x is in the range of 0.01 to 0.50 and n is at least 200. Preferably x is in the range of 0.05 to 0.40 and n is at least 200. These polymers are disclosed in Ser. No. 232,969. The fraction of disulfide repeat units is defined as the excess sulfur over 1.0 sulfurs per aromatic ring for the entire repeat unit as determined by a suitable analytical method.

It has now been discovered that the rate of crystallization of a diphenyl ether modified copoly(arylene sulfide) similar to that disclosed in Ser. No. 232,699 can be increased by blending the diphenyl ether modified copoly(arylene sulfide) with poly(arylene sulfide). This blend can be described as an admixture of (A) from 99.9 to 90 weight percent, based on the weight of the admixture, of a polymer having repeating units corresponding to the structure

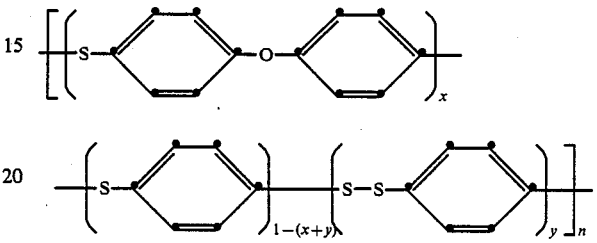

wherein y is in the range of 0.001 to 0.15, x is in the range of 0.01 to 0.50 and n is at least 100, and (B) from 0.1 to 10 weight percent, based on the weight of the admixture, of a poly(phenylene sulfide) corresponding to the structure

where r is at least 25.

The diphenyl ether modified copoly(phenylene sulfide) useful in this invention is prepared by reacting diiodobenzene and diiododiphenyl ether with elemental sulfur in accordance with U.S. Pat. No. 4,786,713.

The polymerization reaction is preferably carried out in the absence of solvents by merely heating and reacting the sulfur and diiodobenzene. Under these conditions, the diiodobenzene compound acts as a solvent for the sulfur and diiododiphenyl ether thereby forming a substantially homogeneous solution enabling a facile and complete reaction.

In another embodiment, the diiodoaromatic compounds and sulfur can be dissolved in an organic solvent which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to perform the polymerization reaction by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiododiphenyl ether, diiodobenzene and sulfur, elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the copyly(arylene sulfide) and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°-400° C. will be suitable, although for particular diiodoaromatic compounds temperatures in excess of 400° C. may be used. Particularly preferred temperature ranges are from about 108°-350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiododiphenyl ether, diiodobenzene and sulfur being combined in a continuous staged reactor to form reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The poly(arylene sulfide) and the manner in which it is prepared is well known in the art and described in U.S. Pat. No. 2,513,188 and U.S. Pat. No. 2,538,941.

The compositions of this invention can be prepared by known techniques for blending polymers. For example, the polymers can be coextruded in conventional twin screw extrusion equipment. Also both polymer may be powdered and the powders throughly mixed in a single screw extruder. Preferably the poly(arylene sulfide) is added to the monomers used to prepare the copoly(arylene sulfide).

The amount of diphenyl ether modified copoly(arylene sulfide) can be from 99.9 to 90 weight percent, preferably 99 to 95 weight percent, based on the weight of the admixture. The amount of poly(arylene sulfide) can be from 0.1 to 10 weight percent, preferably 1 to 5 weight percent, based on the weight of the admixture.

The admixture of this invention is useful for preparation of various shaped articles such as pellets, fibers and molded articles. The polymer can be prepared into these shaped articles by conventional processes, such as injection molding, melt spinning, and melt extrusion.

The composition of this invention can be optionally mixed with inorganic fillers such as fiberglass, mica, talc, wollastonite, etc. or combinations thereof to yield molded articles having a higher modulus and heat distortion temperature than without the filler. Levels of these fillers range from 5 to about 50 wt % based on the total weight of composition plus filler. Fiberglass is a particularly preferred filler and can be obtained in may grades commercially. One particularly advantageous fiberglass grade is grade 497-DB fiberglass from Owens-Corning Company. Compounding of this inorganic filler can be accomplished in any convenient manner such as extrusion of a physical bend of the fiberglass and the polymer granules. Alternatively, the compounding may be done as the polymer is being prepared in the melt.

The enhanced rate of crystalization achieved by addition of poly(phenylene sulfide) to diphenyl ether modified copoly(arylene sulfide) is extremely significant. High rates of crystallization enables crystalline-shaped articles, such as molded parts, extruded fibers or drawn film, to be more easily prepared because processing time is saved, thereby increasing production efficiency.

In the following Examples, rates of crystallization were related to the position of transitions measured with the aid of a DuPont 951 Differential Scanning Calorimeter at a scan rate of 20° C./min. The crystallization on heating was determined by first melting the sample above its melting point (300° C. was used as an ending temperature for all samples) and then rapidly quenching to dry ice temperature on a metal block. The exotherm noted upon reheating is termed the crystallization on heating or Tch. When the sample once again reached 300° C., the sample was cooled at 20° C. per minute and the crystallization exotherm observed was denoted as the crystallization on cooling or Tcc. The difference between Tcc and Tch was then determined (called Delta throughout the examples) and assumed to relate to relative crystallization rates, i.e., higher Deltas demonstrate higher rates of crystallization.

It should be noted that in order to accurately compare relative crystallization rates by using the difference in crystallization on cooling with the crystallization on heating, that not only must the composition be the same, but, also, the molecular weights should be much the same since both of these have profound effects on these transitions. In this vein, it is also necessary to note that although the Delta values tend to be lower for the higher molecular weights, the differences between the Deltas of the nucleated samples and those of the respective control are still very high.

EXAMPLE 1

This example illustrates preparation of compositions of the invention as well as the enhanced rate of crystallization of compositions of the invention as compared to diphenyl ether modified copoly(arylene sulfide) alone.

Into a 500 mL 3-neck round bottom flask are weighed the following: 32 g sulfur (0.998 mol), 389.5 g p-diiodobenzene (1.18 mol, 23 mol % excess) and 21.1 g 4,4'-diiododiphenyl ether (0.050 mol, 5 mol %). 5.23 g 4-iodobiphenyl (0.0187 mol), was also added as a terminator to limit the molecular weight. 0.8 g of 1,3-diiodo-5-nitrobenzene was also added as a catalyst. The flask was fitted with a 350 mm long Vigreux column, a mechanical stirrer through the center joint and an inlet tube for a slow air sweep. The column was attached via a distillation head and a takeoff tube to a distillation receiver, which was cooled in dry ice. The receiver was conected to a vacuum source, The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 0.5 hr and then reduced to 60 torr where it was held for an additiõnal 0.5 hr. The pressure was again reduced to 30 torr, held for 0.5 hr, and then reduced to 1 torr, the bath temperature raised to 250° C. and held there for 1 hr. The temperature was then raised to 300° C. and held there for 1 hr. The temperature was then raised to 300° C. and held there for 30 min. The reaction flask was removed from the metal bath, repressurized with nitrogen, and allowed to cool under nitrogen. The granulated sample was then solid state polymerized by placing ca 7.3 g in a ca 30 mm diameter glass tube, closed at one end, and held in a 240° C. metal block under a 1.0 ft$^3$/hr nitrogen flow for 20 hr. Three other samples were prepared containing various amounts of Ryton P6, a commercially available poly(phenylene sulfide). The samples were prepared by combining the poly(phenylene sulfide) in the form of a very fine powder along with the monomers prior to polymerization. The rates of crystallization of all four polymer samples were studied both before and after solid state polymerization. The rate of crystallization is indicative of the DSC difference between Tcc and Tch, referred to as Delta. These results are reported in the below table.

| Wt % Poly(phenylene sulfide) | Delta | |
|---|---|---|
| | As prepared | After solid starting |
| 0 | 22 | 13 |
| 1.0 | 69 | 46 |
| 2.5 | 79 | 66 |
| 5.0 | 56 | 47 |

The larger Delta values of the compositions of the invention illustrate that the compositions of the invention exhibit enhanced rates of crystallization compared to only diphenyl ether modified copoly(phenylene sulfide).

EXAMPLE 2

This example also illustrates preparation of compositions of the invention as well as the enhanced rate of crystallization of compositions of the invention as compared to diphenyl ether modified copoly(arylene sulfide) alone.

Example 1 was repeated but using only 3.92 g 4-iodobiphenyl (0.0135 mol) as a terminator. The DSC data for Delta are as follows:

| Wt % Poly(phenylene sulfide) | Delta | |
|---|---|---|
| | As prepared | After solid stating |
| 0 | −21 | −18 |
| 1.0 | 66 | 47 |
| 2.5 | 58 | 51 |
| 5.0 | 83 | 65 |

The larger Delta values of the compositions of the invention illustrate that the compositions of the invention exhibit enhanced rates of crystallization compared to only diphenyl ether modified copoly(phenylene sulfide).

EXAMPLE 3

This example also illustrates preparation of compositions of the inventionn as well as the enhanced rate of crystallization of compositions of the invention as compared to diphenyl ether modified copoly(arylene sulfide) alone.

Example 1 was repeated but using instead 369 g p-diiodobenzene (1.12 mol, 22 mol % excess), 42.2 g 4,4'-diiododiphenyl ether (0.10 mol, 10 mol %) and 5.23 g 4-iodobiphenyl (0.0187 mol) as the terminator. Substantially the same amounts of poly(phenylene sulfide) as in Example 1 were used. The DSC data for Delta are as follows:

| Wt % Poly(phenylene sulfide) | Delta | |
|---|---|---|
| | As Prepared | After solid starting |
| 0 | −35 | −34 |
| 1.0 | 53 | 39 |
| 2.4 | 33 | 27 |
| 5.0 | 61 | 45 |

The larger Delta values of the compositions illustrate that the compositions of the invention exhibit enhanced rates of crystallization compared to only the diphenyl ether modified copoly(phenylene sulfide).

EXAMPLE 4

This example illustrates preparation of compositions of the invention as well as the enhanced rate of crystallization of compositions of this invention as compared to the diphenyl ether modified copoly(arylene sulfide) alone.

Example 3 was repeated but using only 3.92 g 4-iodobiphenyl (0.0135 mol) as the terminator. Varying levels of Ryton P6 were added. The DSC data for Delta are as follows:

| Wt % Poly(phenylene sulfide) | Delta | |
|---|---|---|
| | As prepared | After solid stating |
| 0 | nd | nd |
| 1.0 | 24 | 0 |
| 2.4 | 53 | 34 |
| 5.0 | 58 | 38 | nd = not detected

The larger Delta values of the compositions illustrate that compositions of the invention exhibit enhanced rates of crystallization compared to only the diphenyl ether modified copoly(phenylene sulfide). The absence of a Delta value of the control indicates especially slow crystallization.

We claim:

1. A composition comprising an admixture of
   (A) from 99.9 to 90 weight percent, based on the weight of the admixture, of a polymer having repeating units corresponding to the structure

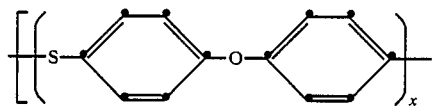

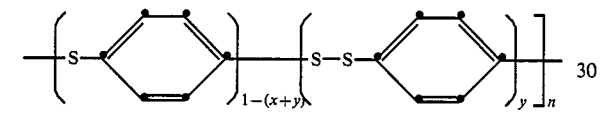

wherein y is in the range of 0.001 to 0.15, x is in the range of 0.01 to 0.50 and n is at least 100, and
   (B) from 0.1 to 10 weight percent, based on the weight of the admixture, of a poly(phenylene sulfide) corresponding to the structure

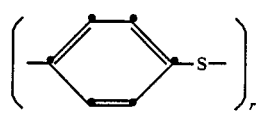

where r is at least 25.

2. The composition of claim 1 wherein (A) is in the range of 99.5 to 95.0 weight percent and (B) is in the range of 0.5 to 5.0 weight percent.

3. A composition comprising an admixture of
   (A) from 99 to 95 weight percent, based on the weight of the admixture, of a polymer having repeating units corresponding to the structure

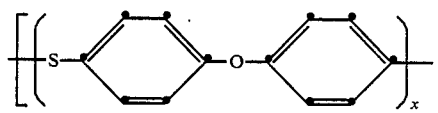

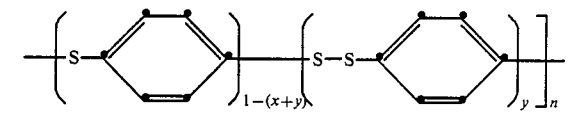

wherein y is in the range of 0.001 to 0.10, x is in the range of 0.05 to 0.40 and n is at least 200, and
   (B) from 1.0 to 5 weight percent, based on the weight of the admixture, of a poly(phenylene sulfide) corresponding to the structure

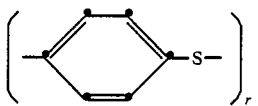

where r is at least 25.

* * * * *